(No Model.)
B. F. COOK.
BUCK POLE.
No. 327,529. Patented Oct. 6, 1885.
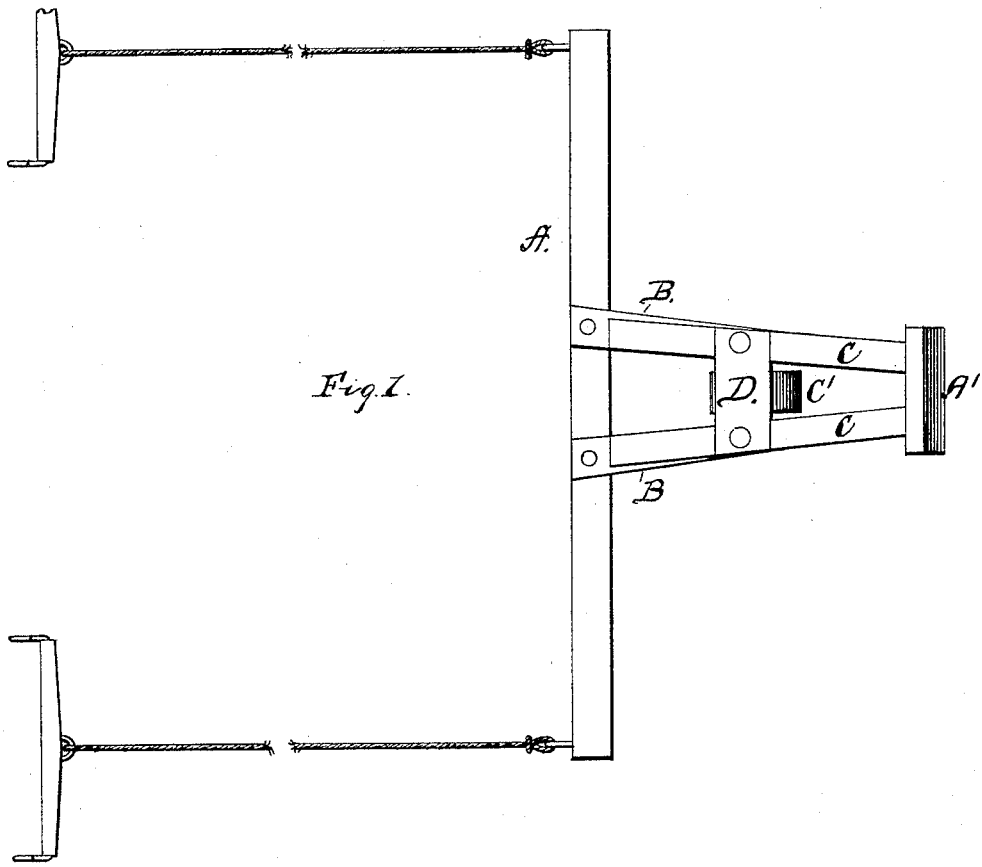
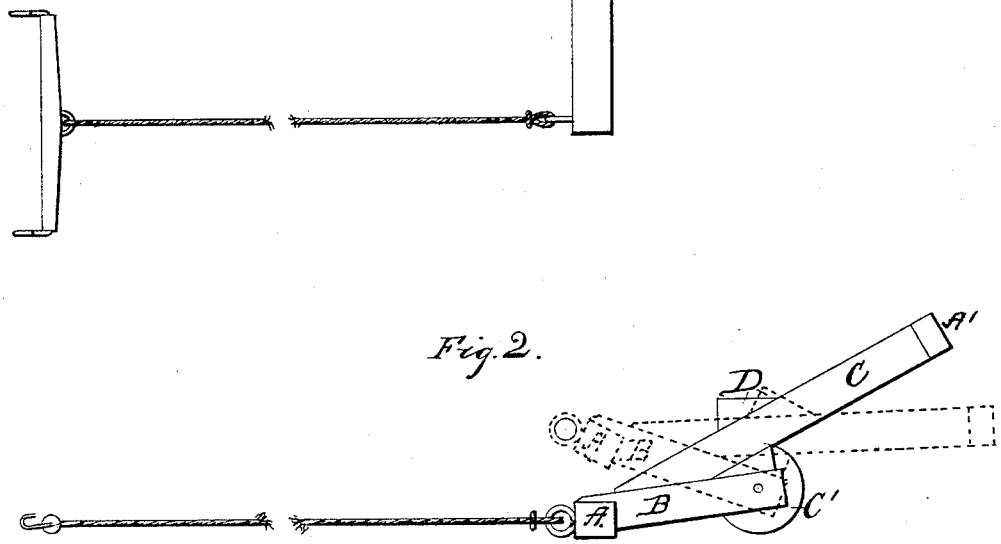
Witnesses
N. A. Clark.
W. B. McKenna
Inventor
Benj. F. Cook.
per H. A. Snow.
atty

United States Patent Office.

BENJAMIN F. COOK, OF SANTA MARIA, CALIFORNIA.

BUCK-POLE.

SPECIFICATION forming part of Letters Patent No. 327,529, dated October 6, 1885.

Application filed April 2, 1884. Serial No. 126,453. (No model.)

*To all whom it may concern:*

Be it known that I, BENJAMIN F. COOK, of Santa Maria, county of Santa Barbara and State of California, have invented a new and useful Improvement in Buck-Poles; and I do hereby declare that the following is a full, clear, and exact description of the invention, which will enable others skilled in the art to which it appertains to make and use it, reference being had to the accompanying drawings, forming a part thereof.

My invention relates to improvements in means for "bucking" or gathering straw cast from the thrasher as it moves through the field; and the object is to provide a machine which will accomplish the desired end in a better manner, with less strain on the team, and less labor on the workman. To this end my invention consists in the novel arrangement and combination of parts, as will be more fully hereinafter described, and specifically claimed.

In the accompanying drawings, forming a part of this specification, Figure 1 is a plan view of my improved bucking-machine, and Fig. 2 is a side view of the same, and showing in dotted lines the position of the machine when the same is about being lifted over the accumulated straw.

The letter A represents the bucking-pole, made of the usual size in all respects, and having attached to the outer ends the usual means for securing thereto the ropes to which the single-trees are fixed, as shown in the drawings.

To the central portion of the bucking-pole are rigidly secured the arms B, extending rearward to such distance as to suit the convenience of the size of the particular machine, and these arms have formed in their rear ends suitable journal-bearings to receive the shaft of the wheel C′, which is made with a broad-faced rim in order that the surface-bearing may be as much as can be conveniently given it.

To the arms B are in turn rigidly secured the lever-arms C, which are inclined upwardly, substantially as seen in the drawings, and have fixed to them over or a little in the rear of the wheel C′ the seat D for the driver. The rear ends of the lever-arms C are connected, preferably, by a cross-piece, A′, in order that they may be operated from their extremity and be additionally braced.

The operation of this machine will be readily understood by those used to the labor of bucking straw. The buck-pole having the draft hitched thereto is in common use for the purposes intended, but is objectionable for the reason that there are no means by which the pole can be thrown over the accumulated straw except by actual handling and lifting over. This difficulty is obviated by my improvement, and in addition thereto I lessen the weight of draft by relieving the pressure of the pole on the ground and throwing it partly on the wheel by means of the weight of the driver on the lever-arm. In operation, after the team is hitched to the bucking-pole, as usual, the driver takes his place upon the seat, and as the machine progresses and the straw has been accumulated in such quantity as is desired the driver applies strength enough on the levers C, which throws the pole upward and permits it to go over the load without stopping the horses. When the machine is over the load, it drops of its own weight, ready to proceed with the work.

What I claim as my invention, and desire to secure by Letters Patent, is—

1. The buck-pole having a rearward extending frame provided with a wheel or roller journaled in the free ends thereof, in combination with levers adapted to lift the buck-pole from the stubble, substantially as described.

2. The buck-pole having a rearward-extending frame provided with a wheel or roller journaled in the free ends thereof, in combination with levers to lift the buck-pole from the stubble and a seat arranged on the frame of the wheel and levers, substantially as described.

In testimony that I claim the foregoing I append my signature.

BENJ. F. COOK.

Witnesses:
B. J. WOOD,
GEO. P. WOOD.